United States Patent Office 3,403,171
Patented Sept. 24, 1968

3,403,171
PROCESS FOR 17α-ACETOXY-6-METHYL-16-METH-YLENE-4,6-PREGNADIENE-3,20-DIONE AND INTERMEDIATES THEREFOR
John M. Beaton, Portage, Mich., assignor to The Upjohn Company, Kalamazoo, Mich., a corporation of Delaware
No Drawing. Filed June 16, 1965, Ser. No. 464,579
16 Claims. (Cl. 260—397.4)

ABSTRACT OF THE DISCLOSURE

This invention relates to certain novel steroids, more particularly to 3β,5α,17α-triacetoxy-6β-methyl-16-methylene-pregnan-20-one, 3β-hydroxy-5α,17α-diacetoxy - 6β-methyl-16-methylenepregnan-20-one and 5α,17α - diacetoxy-6β-methyl-16-methylenepregnane - 3,20 - dione and their use in a process for the preparation of the known compound, 17α-acetoxy-6-methyl - 16 - methylene - 4,6-pregnadiene - 3,20 - dione, a highly active progestational agent.

The novel compounds and process of this invention are illustratively represented by the following sequence of formulae:

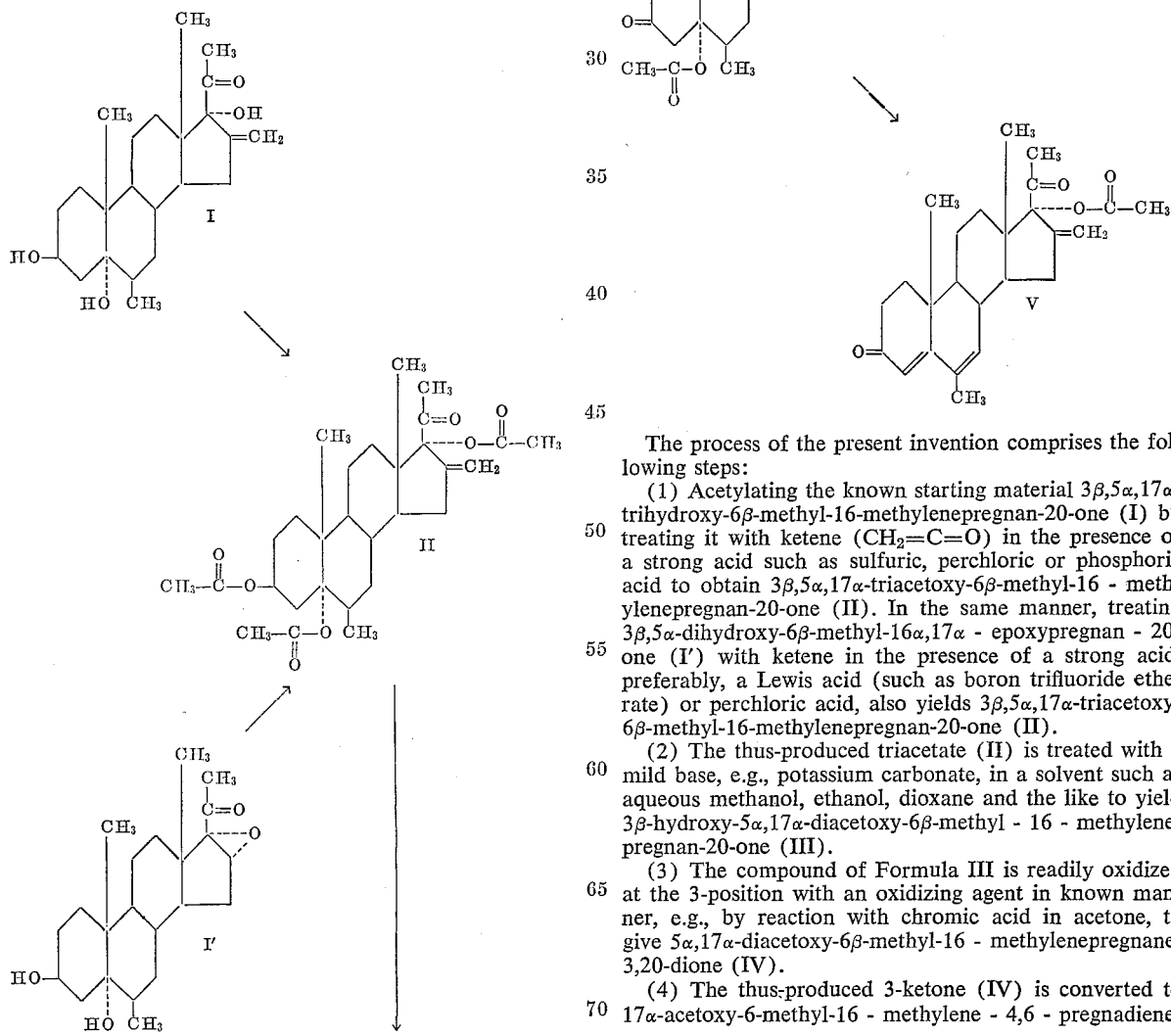

The process of the present invention comprises the following steps:

(1) Acetylating the known starting material 3β,5α,17α-trihydroxy-6β-methyl-16-methylenepregnan-20-one (I) by treating it with ketene ($CH_2$=C=O) in the presence of a strong acid such as sulfuric, perchloric or phosphoric acid to obtain 3β,5α,17α-triacetoxy-6β-methyl-16 - methylenepregnan-20-one (II). In the same manner, treating 3β,5α-dihydroxy-6β-methyl-16α,17α - epoxypregnan - 20-one (I') with ketene in the presence of a strong acid, preferably, a Lewis acid (such as boron trifluoride etherate) or perchloric acid, also yields 3β,5α,17α-triacetoxy-6β-methyl-16-methylenepregnan-20-one (II).

(2) The thus-produced triacetate (II) is treated with a mild base, e.g., potassium carbonate, in a solvent such as aqueous methanol, ethanol, dioxane and the like to yield 3β-hydroxy-5α,17α-diacetoxy-6β-methyl - 16 - methylenepregnan-20-one (III).

(3) The compound of Formula III is readily oxidized at the 3-position with an oxidizing agent in known manner, e.g., by reaction with chromic acid in acetone, to give 5α,17α-diacetoxy-6β-methyl-16 - methylenepregnane-3,20-dione (IV).

(4) The thus-produced 3-ketone (IV) is converted to 17α-acetoxy-6-methyl-16 - methylene - 4,6 - pregnadiene- 3,20-dione (V) by heating the compound of Formula IV at reflux in an inert organic solvent with a dehydrogenating agent such as chloranil (2,3,5,6-tetrachloro-1,4-benzoquinone), p-toluquinone, 1,2 - naphthoquinone, 2,6 - dichloro-p-benzoquinone or p-benzoquinone in the manner discloed in J. Am. Chem. Soc., 82, 4293.

All of the compounds embraced by Formulae II through V can be isolated from their respective reaction mixtures by conventional means, for example, when a water-miscible solvent is used, by pouring the reaction mixture into water and separating the resultant precipitate by filtration. Additional purification of the product can be accomplished by conventional methods, for example, by single solvent elution chromatography from an adsorbent column with a suitable solvent, such as, acetone, methanol, dilute methanol, ethanol, ethylene chloride; also by gradient elution chromatography from an adsorbent column with a suitable mixture of solvents, such as, methylene chloride-Skellysolve B (hexanes), acetone-Skellysolve B, and the like.

The novel compounds of the present invention represented by Formulae II, III and IV and the known compound prepared therefrom, namely, the compound of Formula V, possess anti-inflammatory, progestational, pregnancy maintaining and gonadatropin inhibiting properties.

It is to be undestood that the invention is not to be limited to the exact details of operation or exact compositions shown and described herein, as obvious modifications and equivalents will be apparent to one skilled in the art and the invention is therefore to be limited only by the scope of the appended claims.

EXAMPLE 1

*3β,5α,17α-triacetoxy-6β-methyl-16-methylenepregnan-20-one (II)*

A stirred suspension of 5 g. of 3β,5α,17α-trihydroxy-6β-methyl-16-methylenepregnan-20-one (I) in 1250 ml. of anhydrous ether was saturated with ketene (passed over the suspension from a generator producing about 0.1 mole per hour) during about 1.3 hours; 0.15 g. of sulfuric acid in 5 ml. of ether was then added to the suspension and after stirring for about 2 hours while adding ketene, the mixture was allowed to stand at room temperature for about 16 hours.

Thin-layer chromatography of a sample of the mixture showed that the desired reaction was still incomplete, so a further 0.15 g. of sulfuric acid in 5 ml. of ether was added and ketene was passed over the mixture for an additional 6 hours and the mixture then kept at room temperature for about 16 hours. At this stage thin-layer chromatography showed a favorable balance of products, so the solvent was partially removed under reduced pressure, the concentrated solution diluted with Skellysolve B and chromatographed on a 250 g. column of Florisil (synthetic magnesium silicate). Skellysolve B containing increasing amounts 5 to 20%) of acetone eluted virtually all of the desired compound (II). The middle fractions were crystalline and almost homogeneous as evidenced by thin-layer chromatographic analyses. These fractions were combined and crystallized from methanol to give a first crop of prisms of 3β,5α,17α-triacetoxy - 6β - methyl-16-methylenepregnan-20-one (II) weighing 2.8 g., melting at 175 to 178° C.; a second crop of prisms weighed 0.9 g. and melted at 184 to 186° C.

*Analysis.*—Calcd. for $C_{29}H_{42}O_7$: C, 69.29; H, 8.43. Found: C, 69.11; H, 8.73.

Following the procedure of Example 1 but substituting 3β,5α-dihydroxy-6β-methyl-16α,17α-epoxypregnan-20-one (I') for 3β,5α,17α-trihydroxy-6β-methyl-16-methylenepregnan-20-one (I) as starting material and substituting boron trifluoride etherate for sulfuric acid, also yields 3β,5α,17α - triacetoxy - 6β-methyl-16-methylenepregnan-20-one (II).

EXAMPLE 2

*3β-hydroxy-5α,17α-diacetoxy-6β-methyl-16-methylenepregnan-20-one (III)*

A mixture of 1.507 g. of 3β,5α,17α-triacetoxy-6β-methyl-16-methylenepregnan-20-one (II) (obtained in Example 1), 0.43 g. of potassium carbonate, 120 ml. of methanol and 2.5 ml. of water was stirred under nitrogen for a period of about 2.5 hours, then 360 ml. of water was added and the methanol evaporated under reduced pressure. The precipitated white solid was separated by filtration, washed with water and dissolved in methylene chloride. After drying with sodium sulfate, the solvent was evaporated and the residue redissolved in 50 ml. of acetone. The crude product, 3β-hydroxy-5α,17α-diacetoxy-6β-methyl-16-methylenepregnan-20-one (III) contained in the acetone solution, was not crystallized but used directly without purification in Example 3.

EXAMPLE 3

*5α,17α-diacetoxy-6β-methyl-16-methylenepregnane-3,20-dione (IV)*

The acetone solution of 3β-hydroxy-5α,17α-diacetoxy-6β-methyl-16-methylenepregnan-20-one (III) (obtained in Example 2) was stirred at room temperature while 0.9 ml. of 8 N chromic acid-sulfuric acid was added dropwise (until the yellow color of the reagent persisted). The addition of a few drops of isopropanol discharged the yellow color. Addition of 200 ml. of water and evaporation of acetone under reduced pressure gave an oily solid. The mixture was cooled in an ice-methanol bath for 15 minutes before it was filtered. After washing with water, the solid material (IV) was dissolved in methylene chloride, dried with sodium sulfate and the solvent evaporated. The thus-obtained residue crystallized from a mixture of acetone and Skellysolve B gave 0.62 g. of 5α,17α-diacetoxy-6β-methyl-16-methylenepregnane-3,20-dione (IV), melting at 174 to 175° C.

In an experiment similar to the immediately preceeding one, the product (IV) was crystallized from methylene chloride-Skellysolve B and melted at 168 to 169° C.; it showed infrared and nuclear magnetic resonance spectra in agreement with the 3-keto-5α,17α-diacetoxy structure. Analysis of a sample obtained from this experiment follows:

Calcd. for $C_{27}H_{38}O_6$: C, 70.71; H, 8.33. Found: C, 70.74; H, 8.45.

EXAMPLE 4

*17α-acetoxy-6-methyl-16-methylene-4,6-pregnadiene-3,20-dione (V)*

A mixture of 0.25 g. of 5α,17α-diacetoxy-6β-methyl-16-methylenepregnane-3,20-dione (V) (obtained in Example 3), 0.25 g. of chloranil and 7.5 ml. of diethylene glycol dimethyl ether was refluxed for about 110 minutes, then cooled and diluted with 100 ml. of methylene chloride. The solution was washed 3 times with 100 ml. portions of 1 N sodium hydroxide solution, then 100 ml. of aqueous sodium chloride solution and finally with water until no further color was washed out. The methylene chloride solution was then filtered through magnesium sulfate and charcoal, concentrated and diluted with Skellysolve B and seeded to give 41 mg. of prisms of the desired product, 17α - acetoxy-6-methyl-16-methylene-4,6-pregnadiene-3,20-dione (V), melting at 221 to 222° C.;

$\lambda_{max.}$ 290 mμ ($\epsilon$=22,500); $\nu_{max.}^{chloroform}$ 1750, 1730, 1660, 1640 and 1590 cm.$^{-1}$ The melting point of the product (V) was undepressed on admixture with an authentic sample having a melting point of 221 to 223° C.

Following the procedure of Example 4 but substituting for chloranil another dehydrogenation agent (such as p-toluquinone, 1,2-napthoquinone, 2,6-dichloro-p-benzoquinone, 2,6-dichloro-p-benzoquinone or p-benzoquinone)

also yields 17α-acetoxy-6-methyl-16-methylene-4,6-pregnadiene-3,20-dione (V).

I claim:

1. 3β,5α,17α - triacetoxy - 6β-methyl-16-methylenepregnan-20-one of the formula:

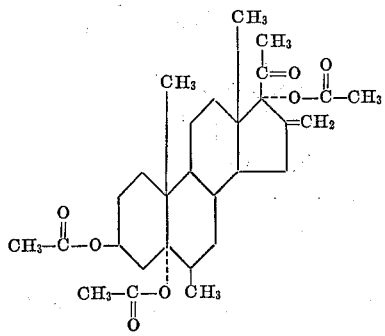

2. 3β-hydroxy-5α,17α-diacetoxy-6β-methyl-16 - methylenepregnan-20-one- of the formula:

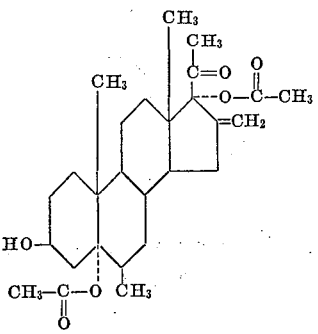

3. 5α,17α-diacetoxy - 6β-methyl-16-methylenepregnane-3,20-dione of the formula:

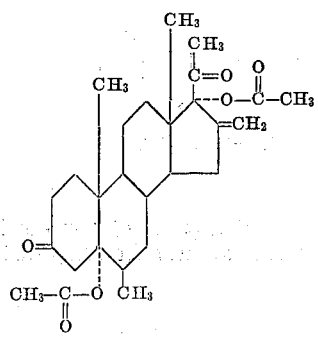

4. A process for the production of the compound of the Formula II

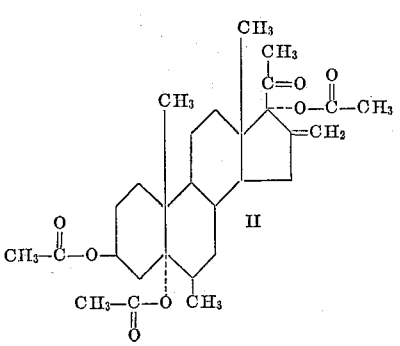

which comprises treating the compound of the Formula I

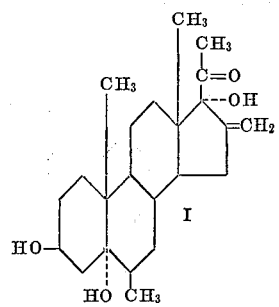

with ketene in the presence of a strong acid.

5. A process for the production of the compound of the Formula II

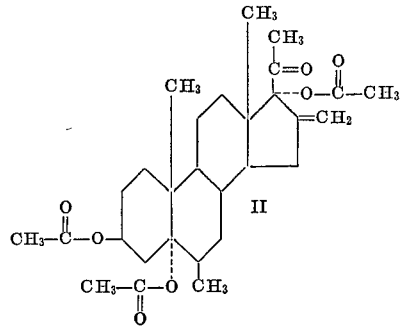

which comprises treating the compound of the Formula I'

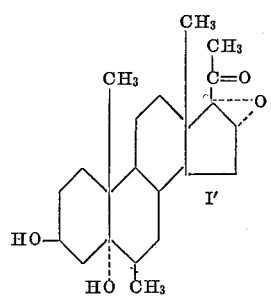

with ketene in the presence of a strong acid.

6. A process for the production of the compound of the Formula III

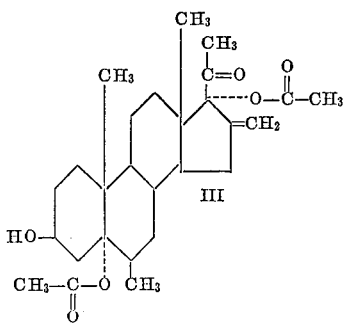

which comprises:
(1) treating the compound of the Formula I

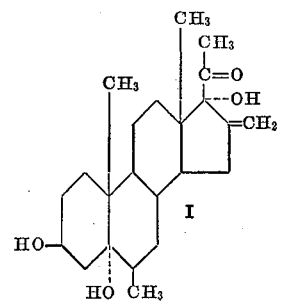

with ketene in the presence of a strong acid to yield the compound of the Formula II and

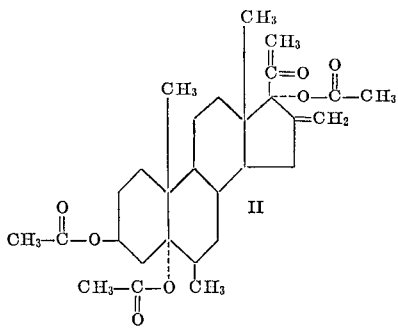

(2) treating the thus-produced compound of Formula II with a mild base to yield the compound of Formula III, above.

7. A process for the production of the compound of the Formula III

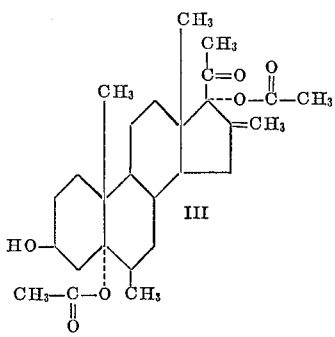

which comprises:
(1) treating the compound of the Formula I'

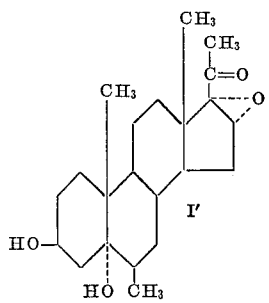

with ketene in the presence of a strong acid to yield the compound of the Formula II, and

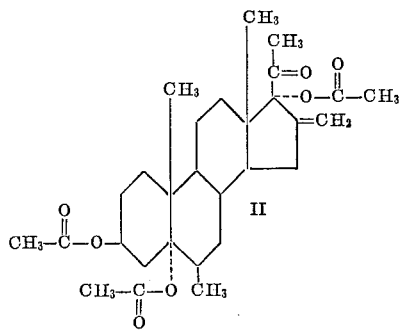

(2) treating the thus-produced compound of Formula II with a mild base to yield the compound of Formula III, above.

8. A process for the production of the compound of the Formula IV

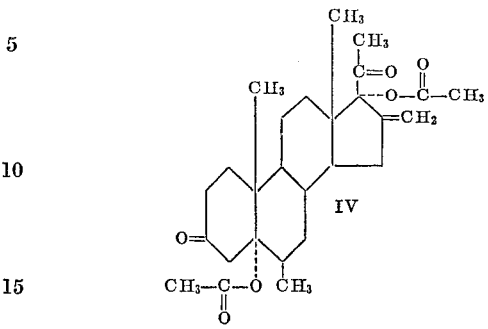

which comprises:
(1) treating the compound of the Formula I

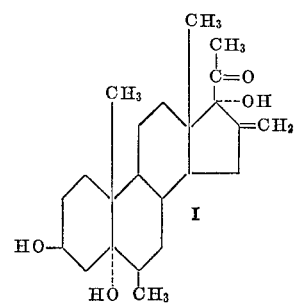

with ketene in the presence of a strong acid to yield the compound of the Formula II

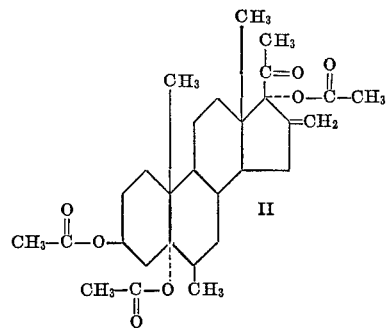

(2) treating the thus-produced compound of Formula II with a mild base to yield the compound of the Formula III

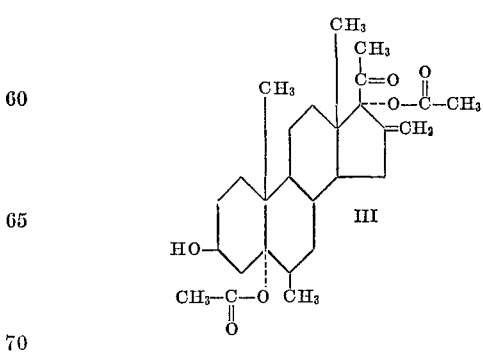

and
(3) treating the thus-produced compound of Formula III with an oxidizing agent to yield the compound of Formula IV, above.

9. A process for the production of the compound of the Formula IV

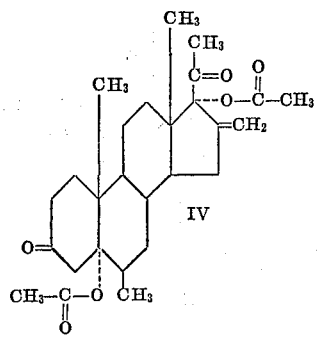

which comprises:
(1) treating the compound of the Formula I′

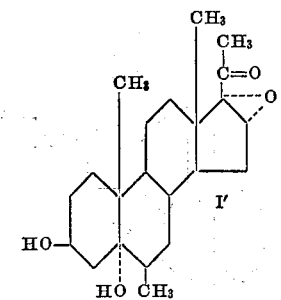

with ketene in the presence of a strong acid to yield the compound of the Formula II

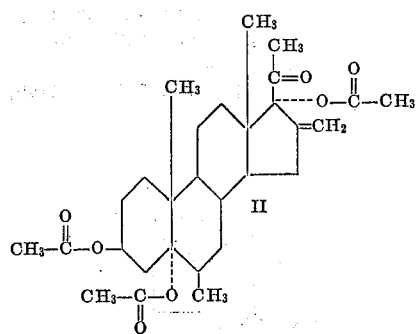

(2) treating the thus-produced compound of Formula II with a mild base to yield the compound of the Formula III

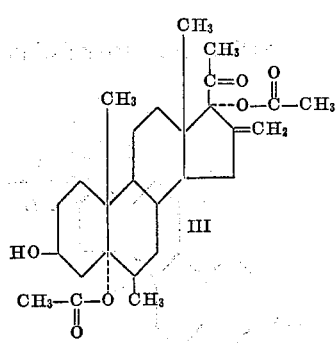

and
(3) treating the thus-produced compound of Formula III with an oxidizing agent to yield the compound of Formula IV, above.

10. A process for the production of the compound of the Formula V

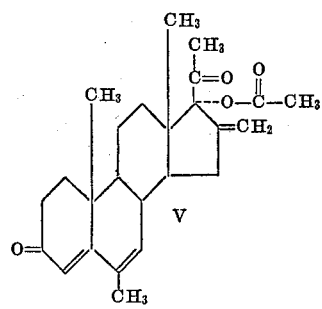

which comprises:
(1) treating the compound of the Formula I

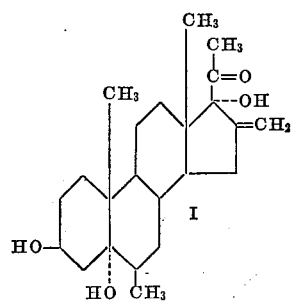

with ketene in the presence of a strong acid to yield the compound of the Formula II

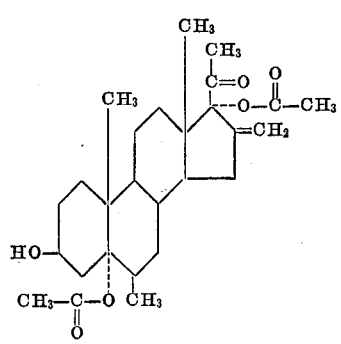

(2) treating the thus-produced compound of Formula II with a mild base to yield the compound of the Formula III (3) treating the thus-produced compound of Formula III with an oxidizing agent to yield the compound of the Formula IV

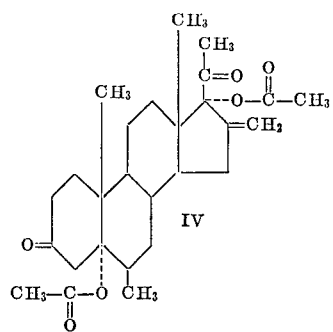

and
(4) treating the thus-produced compound of Formula IV with a dehydrogenating agent to yield the compound of Formula V, above.

11. A process for the production of the compound of the Formula V

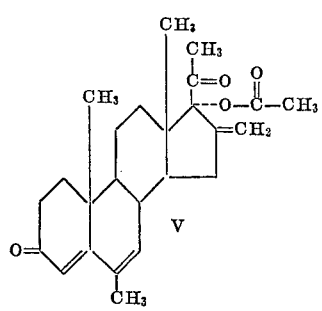

which comprises:
(1) treating the compound of the Formula I′

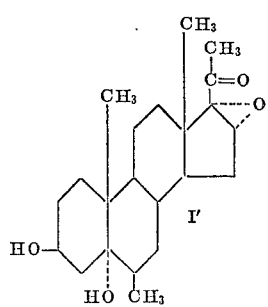

with ketene in the presence of a strong acid to yield the compound of the Formula II

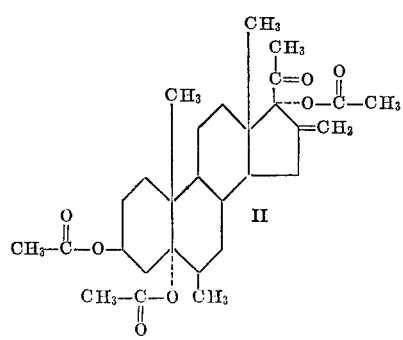

(2) treating the thus-produced compound of Formula II with a mild base to yield the compound of the Formula III

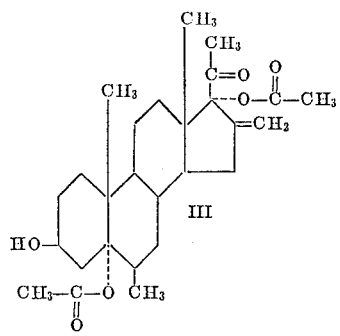

(3) treating the thus-produced compound of Formula III with an oxidizing agent to yield the compound of the Formula IV

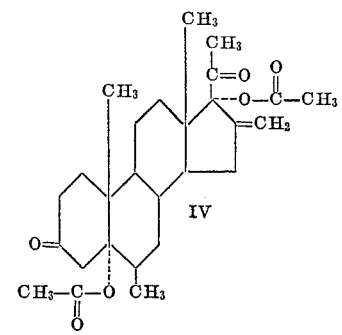

and
(4) treating the thus-produced compound of Formula IV with a dehydrogenating agent to yield the compound of Formula V, above.

12. A process for the production of the compound of the Formula III

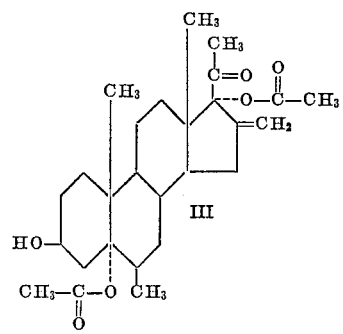

which comprises treating the compound of the Formula II

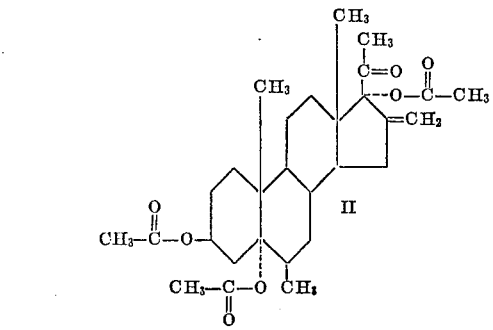

with a mild base.

13. A process for the production of the compound of the Formula IV

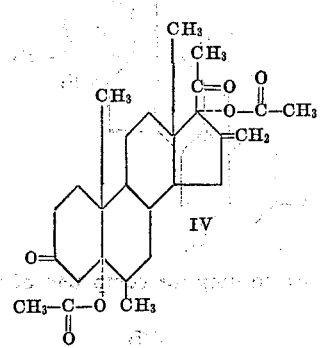

which comprises:
(1) treating the compound of the Formula II

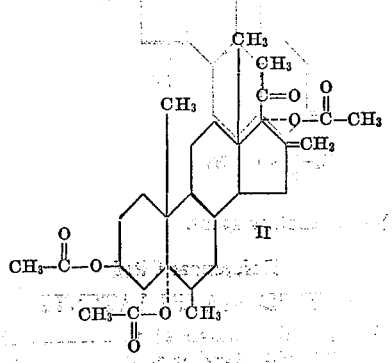

with a mild base to yield the compound of the Formula III

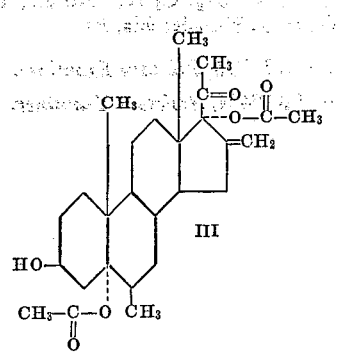

and
(2) treating the thus-produced compound of Formula III with an oxidizing agent to yield the compound of Formula IV, above.

14. A process for the production of the compound of the Formula V

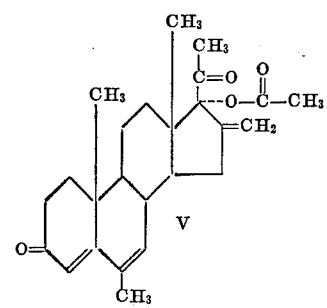

which comprises:
(1) treating the compound of the Formula II

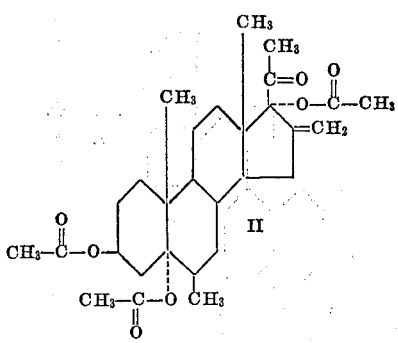

with a mild base to yield the compound of the Formula III

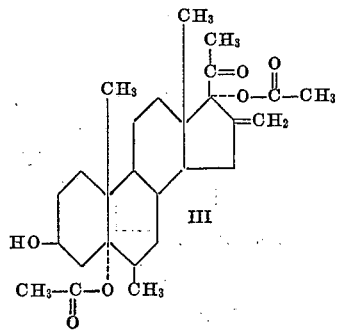

(2) treating the thus-produced compound of Formula III with an oxidizing agent to yield the compound of the Formula IV

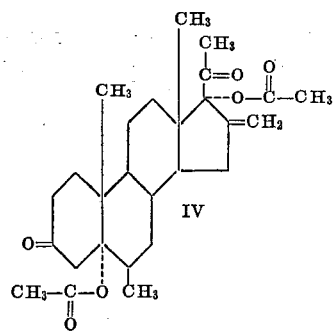

and
(3) treating the thus-produced compound of Formula IV with a dehydrogenating agent to yield the compound of Formula V, above.

15. A process for the production of the compound of the Formula V

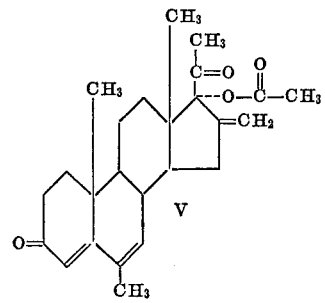

which comprises:
(1) treating the compound of the Formula III

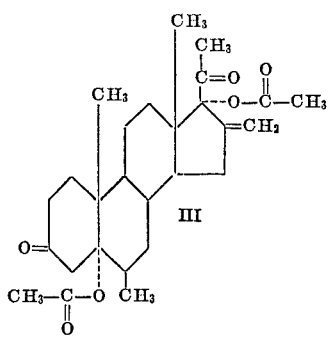

with an oxidizing agent to yield the compound of the Formula IV

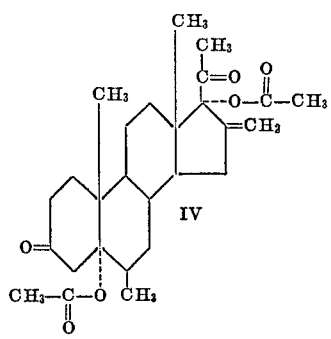

and
(2) treating the thus-produced compound of Formula IV with a dehydrogenating agent to yield the compound of Formula V, above.

16. A process for the production of the compound of the Formula V

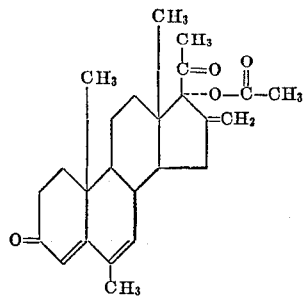

which comprises treating the compound of the Formula IV

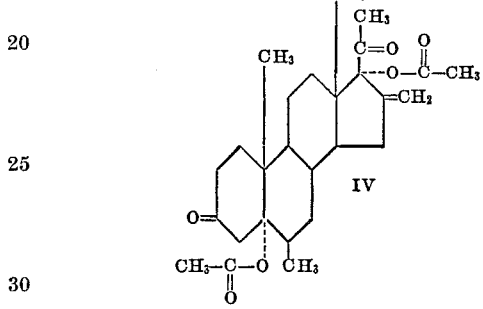

with a dehydrogenating agent.

References Cited
UNITED STATES PATENTS

| | | | |
|---|---|---|---|
| 3,096,350 | 7/1963 | Iriarte et al. | 260—397.4 |
| 3,145,199 | 8/1964 | Graber et al. | 260—239.55 |
| 3,206,359 | 9/1965 | Sarett et al. | 260—397.4 |

OTHER REFERENCES

Noller, "Chem. of Org. Cpds.," 3rd ed., 1965, p. 809, W. B. Saunders Co., Philadelphia, Pa.

ELBERT L. ROBERTS, *Primary Examiner.*

JOHNNIE R. BROWN, *Assistant Examiner.*